US012785586B2

(12) United States Patent

Mukunoki et al.

(10) Patent No.: US 12,785,586 B2
(45) Date of Patent: Nov. 3, 2026

(54) POWER CONVERSION DEVICE AND CONTROL DEVICE FOR VIRTUAL SYNCHRONOUS GENERATOR WITH EXCESS CURRENT SUPPRESSION

(71) Applicant: Mitsubishi Electric Corporation, Tokyo (JP)

(72) Inventors: Kaho Mukunoki, Tokyo (JP); Toshiyuki Fujii, Tokyo (JP); Ryosuke Uda, Tokyo (JP); Kota Hamanaka, Tokyo (JP); Shuhei Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 18/697,911

(22) PCT Filed: Oct. 7, 2021

(86) PCT No.: PCT/JP2021/037192

§ 371 (c)(1),
(2) Date: Apr. 2, 2024

(87) PCT Pub. No.: WO2023/058195

PCT Pub. Date: Apr. 13, 2023

(65) Prior Publication Data

US 2024/0297597 A1 Sep. 5, 2024

(51) Int. Cl.
*H02M 7/5387* (2007.01)
*H02M 1/00* (2007.01)
(Continued)

(52) U.S. Cl.
CPC ..... *H02M 7/53871* (2013.01); *H02M 1/0025* (2021.05); *H02M 7/48* (2013.01); *H02M 7/757* (2013.01); *H02M 7/487* (2013.01)

(58) Field of Classification Search
CPC ...... H02M 7/505; H02M 7/515; H02M 7/521; H02M 7/525; H02M 7/527; H02M 7/537;
(Continued)

(56) References Cited

U.S. PATENT DOCUMENTS

2016/0006338 A1* 1/2016 Sakimoto .......... H02M 7/53875 363/131
2016/0134201 A1 5/2016 Lu et al.
(Continued)

FOREIGN PATENT DOCUMENTS

JP 2016093100 A 5/2016
JP 2018137925 A 8/2018
(Continued)

OTHER PUBLICATIONS

International Search Report (PCT/ISA/210) with translation and Written Opinion (PCT/ISA/237) mailed Dec. 14, 2021, by the Japan Patent Office for International Application No. PCT/JP2021/037192. (9 pages).
(Continued)

*Primary Examiner* — Jue Zhang
*Assistant Examiner* — Ularislao Cordova
(74) *Attorney, Agent, or Firm* — .Buchanan Ingersoll & Rooney PC

(57) ABSTRACT

A current suppression control unit calculates correction terms of reference voltage command values for operating a power converter as a voltage source. The correction terms are calculated to compensate for respective current deviations of output currents transformed on two axes, with respect to current command values on a two-axis rotating coordinate system for suppressing an output current of the power converter to less than or equal to a control upper limit value. A proportional control unit has proportional elements to reflect the current deviations in the correction terms
(Continued)

within the same axes of the two axes. A decoupling control unit has integral elements to reflect the current deviations in the correction terms between the different two axes.

7 Claims, 6 Drawing Sheets

(51) Int. Cl.

| | |
|---|---|
| ***H02M 7/48*** | (2007.01) |
| ***H02M 7/487*** | (2007.01) |
| ***H02M 7/757*** | (2006.01) |

(58) Field of Classification Search
CPC ..... H02M 7/5387–53875; H02M 7/539–5395; H02M 7/42–98; H02M 1/325; H02J 3/38–50
See application file for complete search history.

(56) References Cited

U.S. PATENT DOCUMENTS

| | | | | |
|---|---|---|---|---|
| 2021/0194383 | A1* | 6/2021 | Tsuruma | H02J 3/38 |
| 2022/0399801 | A1* | 12/2022 | Suzuki | H02M 1/0093 |
| 2024/0275165 | A1* | 8/2024 | Fujii | H02M 1/0009 |
| 2024/0388221 | A1* | 11/2024 | Mukunoki | H02M 7/48 |
| 2025/0192660 | A1* | 6/2025 | Uemura | H02M 7/5395 |

FOREIGN PATENT DOCUMENTS

| | | |
|---|---|---|
| JP | 2019080476 A | 5/2019 |
| JP | 2020043688 A | 3/2020 |
| WO | 2021029313 A1 | 2/2021 |

OTHER PUBLICATIONS

Cunha, et al., “Generalized Formulation of Steady-State Equivalent Circuit Models of Grid-Forming Inverters”, IEEE Open Access Journal of Power and Energy, vol. 08, Aug. 30, 2021, pp. 352-364.
Dong, et al., “Active Voltage Feedback Control for Hybrid Multiterminal HVDC System Adopting Improved Synchronverters”, IEEE Transactions on Power Delivery, vol. 31, No. 2, Apr. 2016, pp. 445-455.
Extended European Search Report dated Nov. 6, 2024, issued in the corresponding European Patent Application No. 21959937.0, 8 pages.

* cited by examiner

POWER CONVERSION DEVICE AND CONTROL DEVICE FOR VIRTUAL SYNCHRONOUS GENERATOR WITH EXCESS CURRENT SUPPRESSION

TECHNICAL FIELD

The present disclosure relates to a power conversion device and a control device.

BACKGROUND ART

In recent years, renewable energy generated by dispersed-type power sources such as solar power generation facilities have been introduced into power systems. Since a dispersed-type power source is connected to a power system via a power converter, if the amount of introduced renewable energy increases, the ratio of synchronous generators connected to the power system decreases, and thereby there is a concern that an inertia force of the power system with respect to frequency change may decrease.

Thus, there has been proposed virtual synchronous generator control that compensates for a decreased inertia force by causing a power conversion device interconnected to a system to perform a behavior similar to that of a synchronous generator. Specifically, a power converter having a voltage control-type virtual synchronous generator control function (hereinafter also referred to as a "virtual synchronous generator") is controlled to simulate a behavior in a case where a synchronous power generator to be simulated is connected to a power system.

For example, Japanese Patent Laying-Open No. 2019-80476 (PTL 1) describes that, in computing a voltage command value for an alternating current (AC)/direct current (DC) converter according to an output command value for virtual synchronous generator control, if a short circuit accident occurs in a power system, an output current suppression unit performs control to change an internal impedance of a virtual synchronous generator such that an output current of the AC/DC converter may not exceed a current limit value.

CITATION LIST

Patent Literature

PTL 1: Japanese Patent Laying-Open No. 2019-80476

SUMMARY OF INVENTION

Technical Problem

Since a virtual synchronous generator operates as a voltage source, if a short circuit accident occurs in a power system and a voltage at an interconnection point decreases, a voltage difference between an output voltage of the virtual synchronous generator and the voltage at the interconnection point increases. Thus, an output current of a power converter becomes excessive, and thereby the power converter is stopped for protection, which poses a problem.

To deal with this problem, in PTL 1, if a short circuit accident occurs in the power system, control is performed to change the internal impedance of the virtual synchronous generator and compute the voltage command value as a voltage source, to thereby decrease the voltage difference such that an excess current may not occur. Therefore, in the technique of PTL 1, in order to obtain an appropriate current suppression effect in case of a system accident, it is necessary to set the amount of change of the internal impedance of the virtual synchronous generator as appropriate.

However, since a system impedance changes depending on a load state and the like, and also changes depending on the manner of a short circuit accident, it becomes difficult to make the amount of change (the increased amount) of the internal impedance of the virtual synchronous generator in the output current suppression unit of PTL 1 appropriate to correspond to the system impedance. As a result, there is a concern that the effect of suppressing an excess current may not be stably obtained.

An object in an aspect of the present disclosure is to provide a power conversion device and a control device capable of stably performing control that operates a power converter interconnected to a power system as a voltage source and suppresses occurrence of an excess current.

Solution to Problem

According to an embodiment of the present disclosure, a power conversion device is provided. The power conversion device includes at least one power converter and a control device. The power converter is configured to include switching elements, for converting DC power from a DC power source into AC power and outputting the AC power to a power system. The control device controls power conversion in the power converter. The control device includes a voltage control unit, a current suppression control unit, and a switching control unit. The voltage control unit generates a reference voltage command value for operating the power converter as a voltage source that outputs an AC voltage having a frequency and a phase which are different from those in the power system. The current suppression control unit generates a voltage command value based on an output current from the power converter and the reference voltage command value, the voltage command value being obtained by reflecting a correction term for suppressing the output current to less than or equal to a predefined control upper limit value, in the reference voltage command value. The switching control unit controls turning on/off of the switching elements of the power converter according to the voltage command value in which the correction term is reflected. The current suppression control unit has a current command value generation unit, a control computation unit, and a voltage command value correction unit. The current command value generation unit generates current command values of a first axis and a second axis on a two-axis rotating coordinate system, for suppressing the output current to less than or equal to the control upper limit value. The control computation unit calculates, on the rotating coordinate system, the correction term for compensating for respective current deviations of the output current of the first axis and the second axis transformed on the rotating coordinate system, with respect to the current command values of the first axis and the second axis. The voltage command value correction unit calculates the voltage command value by reflecting the correction term in the reference voltage command value. The control computation unit has a proportional element and an integral element. The proportional element is configured to reflect the current deviation of the first axis in the correction term of the first axis, and reflect the current deviation of the second axis in the correction term of the second axis. The integral element is configured to reflect the current deviation of the first axis in the correction term of the second axis, and reflect the current deviation of the second axis in the correction term of the first axis.

According to another embodiment of the present disclosure, a control device for a power converter configured to include switching elements, for converting DC power from a DC power source into AC power and outputting the AC power to a power system is provided. The control device includes a voltage control unit, a current suppression control unit, and a switching control unit. The voltage control unit generates a reference voltage command value for operating the power converter as a voltage source that outputs an AC voltage having a frequency and a phase which are different from those in the power system. The current suppression control unit generates a voltage command value based on an output current from the power converter and the reference voltage command value, the voltage command value being obtained by reflecting a correction term for suppressing the output current to less than or equal to a predefined control upper limit value, in the reference voltage command value. The switching control unit controls turning on/off of the switching elements of the power converter according to the voltage command value in which the correction term is reflected. The current suppression control unit includes a current command value generation unit, a control computation unit, and a voltage command value correction unit. The current command value generation unit generates current command values of a first axis and a second axis on a two-axis rotating coordinate system, for suppressing the output current to less than or equal to the control upper limit value. The control computation unit calculates, on the rotating coordinate system, the correction term for compensating for respective current deviations of the output current of the first axis and the second axis transformed on the rotating coordinate system, with respect to the current command values of the first axis and the second axis. The voltage command value correction unit calculates the voltage command value by reflecting the correction term in the reference voltage command value. The control computation unit has a proportional element and an integral element. The proportional element is configured to reflect the current deviation of the first axis in the correction term of the first axis, and reflect the current deviation of the second axis in the correction term of the second axis. The integral element is configured to reflect the current deviation of the first axis in the correction term of the second axis, and reflect the current deviation of the second axis in the correction term of the first axis.

Advantageous Effects of Invention

According to the present disclosure, it is possible to stably perform control that operates a power converter interconnected to a power system as a voltage source and suppresses occurrence of an excess current.

DESCRIPTION OF EMBODIMENTS

Figure 1:
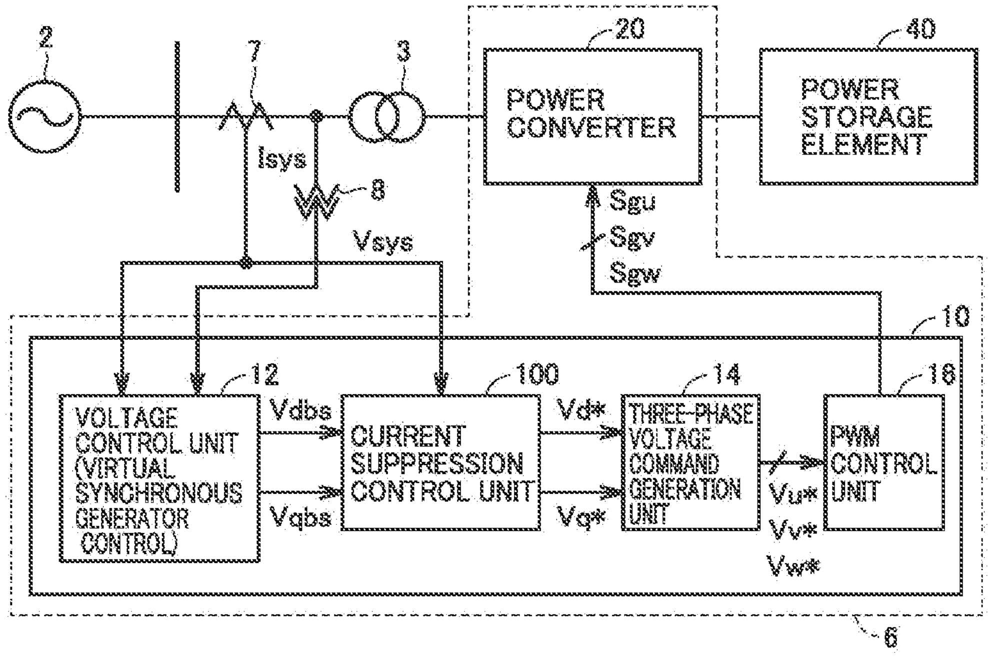
FIG. 1 is a block diagram illustrating a configuration of a power conversion system as an example of application of a power conversion device in accordance with the present embodiment.

Hereinafter, an embodiment of the present disclosure will be described in detail with reference to the drawings. It should be noted that, in the following, identical or corresponding parts in the drawings will be designated by the same numerals, and the description thereof will not be repeated in principle.

<Description of System Configuration>

FIG. 1 is a block diagram illustrating a configuration of a power conversion system as an example of application of a power conversion device in accordance with the present embodiment. The power conversion system includes a power system 2, a voltage transformer 3, a power conversion device 6, a current detector 7, a voltage detector 8, and a power storage element 40. Power conversion device 6 includes a control device 10 and a power converter 20.

Power converter 20 performs DC/AC power conversion between power storage element 40 that stores DC power and three-phase AC power system 2. Specifically, power converter 20 is connected to power system 2 via voltage transformer 3, to convert DC power from power storage element 40 into AC power and output the AC power to power system 2. On this occasion, power converter 20 is controlled by control device 10 as a voltage source, as described later.

Figure 2:
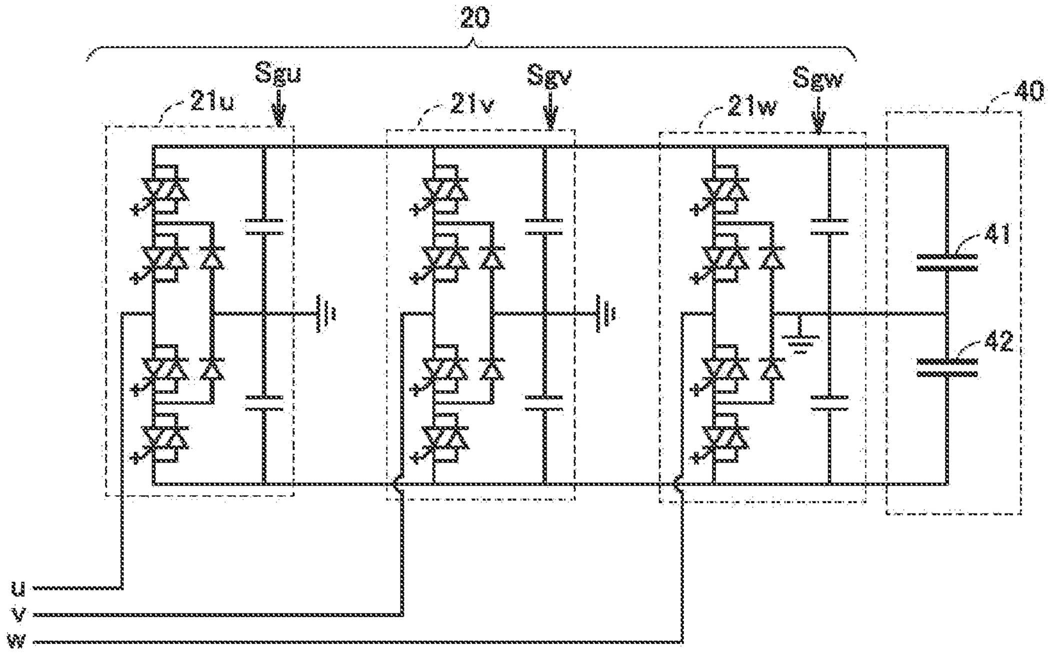
FIG. 2 is a circuit diagram showing an exemplary configuration of a power converter shown in FIG. 1.

FIG. 2 shows a circuit diagram illustrating an exemplary configuration of power converter 20.

Referring to FIG. 2, power storage element 40 includes capacitors 41 and 42 connected in series. It should be noted that, as power storage element 40, a DC power storage element including a secondary battery is arbitrarily applicable instead of a capacitor. Power storage element 40 corresponds to one embodiment of a "DC power source".

Power converter 20 has three-level inverters 21*u*, 21*v*, and 21*w* as three-level converters. Each of three-level inverters 21*u*, 21*v*, and 21*w* is a known configuration having four switching elements constituted by triacs, and converts a DC voltage of capacitors connected in parallel with power storage element 40 into a sinusoidal AC voltage by pulse width modulation (PWM) control of the four switching elements.

Control signals Sgu, Sgv, and Sgw inputted into three-level inverters 21*u*, 21*v*, and 21*w*, respectively, shown in FIG. 2 each collectively indicate on/off control signals of the four switching elements (four signals) in each three-level inverter which are generated by the PWM control.

Three-level inverters 21*u*, 21*v*, and 21*w* output the sinusoidal AC voltages having phases different from each other by 120 degrees, to three-phase transmission lines, respectively. Thereby, power converter 20 operates as a three-phase three-level converter.

It should be noted that power converter 20 can be constituted by a self-commutated converter such as a two-level converter or a modular multilevel converter, as long as it has a DC/AC power conversion function. Further, as for the DC side, that is, the "DC power source", a DC system constituted by a DC transmission line may be connected instead of power storage element 40.

Referring to FIG. 1 again, current detector 7 detects three-phase AC currents of power system 2 (more specifically, an interconnection point of power converter 20). Specifically, current detector 7 detects an AC current Ia of an a phase, an AC current Ib of a b phase, and an AC current Ic of a c phase outputted from power converter 20 to power system 2. AC currents Ia, Ib, and Ic are inputted into control device 10. In the following, AC currents Ia, Ib, and Ic are also collectively referred to as an AC current Isys. It should be noted that AC current Isys inputted into current suppression control unit 100 corresponds to an "output current" from power converter 20 to power system 2. AC current Isys (Ia, Ib, Ic) inputted into current suppression control unit 100 may be detected on a primary side (power converter 20 side) of voltage transformer 3.

Voltage detector 8 detects three-phase AC voltages of power system 2 (more specifically, the interconnection point of power converter 20). Specifically, voltage detector 8 detects an AC voltage Va of the a phase, an AC voltage Vb of the b phase, and an AC voltage Vc of the c phase of power system 2. AC voltages Va, Vb, and Vc are inputted into control device 10. In the following, AC voltages Va, Vb, and Vc are also collectively referred to as an AC voltage Vsys.

Control device 10 includes a voltage control unit 12, a three-phase voltage command generation unit 14, a PWM control unit 16, and a current suppression control unit 100, as functions of controlling power converter 20.

Figure 3:
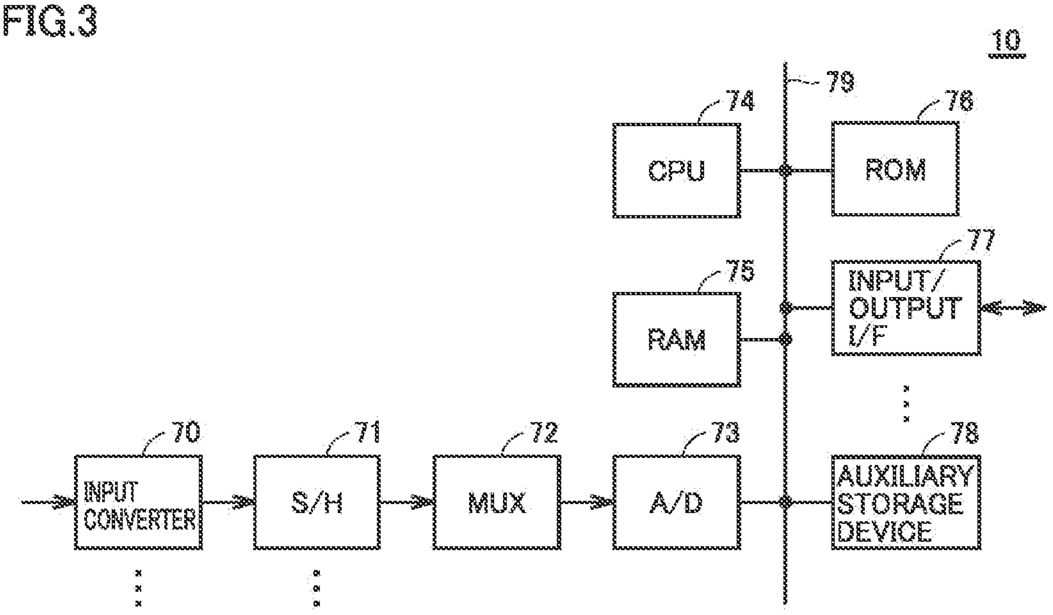
FIG. 3 is a block diagram showing an exemplary hardware configuration of a control device shown in FIG. 1.

FIG. 3 shows an exemplary hardware configuration of control device 10. FIG. 3 shows an example in which control device 10 is constituted by a computer.

Referring to FIG. 3, control device 10 includes one or more input converters 70, one or more sample hold (S/H) circuits 71, a multiplexer (MUX) 72, an A/D converter 73, one or more CPUs (Central Processing Units) 74, a RAM (Random Access Memory) 75, a ROM (Read Only Memory) 76, one or more input/output interfaces 77, and an auxiliary storage device 78. Further, control device 10 includes a bus 79 that mutually connects the components.

Input converter 70 has an auxiliary transformer for each input channel. Each auxiliary transformer converts signals detected by current detector 7 and voltage detector 8 in FIG. 1 into signals having a voltage level suitable for subsequent signal processing.

Sample hold circuit 71 is provided for each input converter 70. Sample hold circuit 71 samples a signal indicating the amount of electricity received from corresponding input converter 70 using a defined sampling frequency, and holds the signal.

Multiplexer 72 sequentially selects the signals held in a plurality of sample hold circuits 71. A/D converter 73 converts a signal selected by multiplexer 72 into a digital value. It should be noted that A/D conversion may be performed in parallel on detection signals of a plurality of input channels by providing a plurality of A/D converters 73.

CPU 74 controls entire control device 10, and performs computation processing according to a program. RAM 75 as a volatile memory and ROM 76 as a nonvolatile memory are used as main storages for CPU 74. ROM 76 stores programs, set values for signal processing, and the like. Auxiliary storage device 78 is a nonvolatile memory having a capacity larger than that of ROM 76, and stores programs, data of electricity amount detection values, and the like.

Input/output interface 77 is an interface circuit in communicating between CPU 74 and an external device.

It should be noted that it is also possible to constitute at least a portion of control device 10 using a circuit such as an FPGA (Field Programmable Gate Array) and an ASIC (Application Specific Integrated Circuit), unlike the example in FIG. 2.

Referring to FIG. 1 again, the functions of voltage control unit 12, three-phase voltage command generation unit 14, PWM control unit 16, and current suppression control unit 100 are implemented by hardware processing and/or software processing by control device 10.

Voltage control unit 12 generates voltage command values Vdbs and Vqbs on a two-axis (d-q axis) rotating coordinate system, as voltage command values for operating power converter 20 as a virtual synchronous generator. In the following, voltage command values Vdbs and Vqbs generated by voltage control unit 12 will be referred to as reference voltage command values Vdbs and Vqbs.

Current suppression control unit 100 generates final voltage command values Vd* and Vq* of the d-q axes, by reflecting a correction term by current suppression control for suppressing an excessive current, in reference voltage command values Vdbs and Vqbs.

Three-phase voltage command generation unit 14 transforms voltage command values Vd* and Vq* of the d-q axes into three-phase voltage command values Vu*, Vv*, and Vw*, by predefined two-phase/three-phase coordinate transformation. When the amount of correction by the current suppression control is zero, voltage command values Vu*, Vv*, and Vw* are sinusoidal voltages having phases deviated from each other by 120 degrees.

PWM control unit 16 generates on/off control signals Sgu, Sgv, and Sgw for the four switching elements of each of three-level inverters 21*u*, 21*v*, and 21*w* shown in FIG. 2, by the PWM control that compares each of three-phase voltage command values Vu*, Vv*, and Vw* with a carrier signal.

Three-level inverter 21*u* outputs a sinusoidal AC voltage according to voltage command value Vu* by on/off operation of the four switching elements according to on/off control signal Sgu. Similarly, three-level inverter 21*v* outputs a sinusoidal AC voltage according to voltage command value Vv* by switching operation according to on/off control signal Sgv, and three-level inverter 21*w* outputs a sinusoidal AC voltage according to voltage command value Vw* by switching operation according to on/off control signal Sgw. It is to be understood that, through such a switching operation, through the switching operation according to the voltage command values, power converter 20 operates as a voltage source that outputs an AC voltage having an amplitude and a phase which are different from those in power system 2.

It should be noted that, in voltage control unit 12, reference voltage command values Vdbs and Vqbs for simulating a behavior in a case where a synchronous power generator is connected to the power system can be produced by any known technique. For example, in PTL 1, d-q axis voltage command values obtained by performing three-phase/two-phase transformation on (three-phase) voltage command values generated in a state where operation of the output current suppression unit is stopped and the internal impedance is set constant are equivalent to reference voltage command values Vdbs and Vqbs generated by voltage control unit 12.

That is, in the present embodiment, when the reference voltage command values are not corrected by current suppression control unit 100, the voltage command values are directly set as Vd*=Vdbs and Vd*=Vqbs, and power converter 20 is controlled as a voltage source for ordinary virtual synchronous generator control.

<Detailed Description of Control System>

Next, a configuration of current suppression control unit 100 for suppressing an excessive current arranged in the present embodiment will be described.

Figure 4:
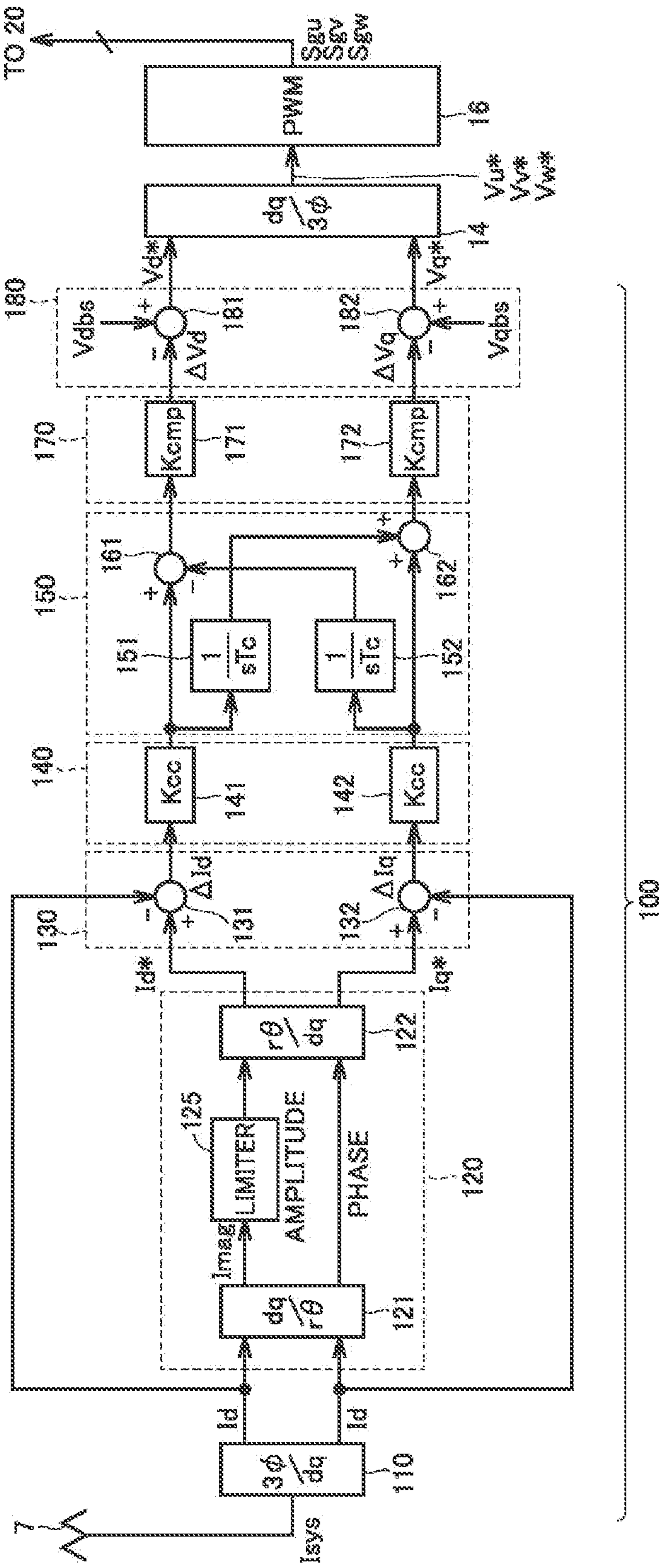
FIG. 4 is a block diagram illustrating a configuration of a current suppression control unit shown in FIG. 1.

FIG. 4 is a block diagram illustrating a configuration of current suppression control unit 100.

As shown in FIG. 4, current suppression control unit 100 includes a coordinate transformation unit 100, a current command value generation unit 120, a deviation computation unit 130, a proportional control unit 140, a decoupling control unit 150, an adjustment gain multiplication unit 170, and a voltage command value correction unit 180.

Coordinate transformation unit 110 performs three-phase/two-phase (3ϕ/dq) transformation on three-phase AC current Isys detected by current detector 7, and generates a d-axis current Id and a q-axis current Iq on the two-axis rotating coordinate system.

Current command value generation unit 120 has coordinate transformation units 121 and 122, and a limiter 125. Coordinate transformation unit 121 performs polar coordinate (rθ) transformation on d-axis current Id and q-axis current Iq on the d-q axes, and thereby outputs a current amplitude Imag and a current phase θi.

Current amplitude Imag and current phase θi are indicated by the following equations (1) and (2), using d-axis current Id and q-axis current Iq.

$$Imag = \sqrt{(Id^2 + Iq^2)} \tag{1}$$

$$\theta i = \tan^{-1}(Iq/Id) \tag{2}$$

When current amplitude Imag is more than or equal to a predefined control upper limit value Imax, limiter 125 outputs control upper limit value Imax. On the other hand, in the case of Imag<Imax, limiter 125 outputs current amplitude Imag from coordinate transformation unit 121. Since the description is given herein on an assumption that a current amplitude of AC current Isys is equal to current amplitude Imag determined by equation (1), an upper limit value in limiter 125 can be set to the same value as a control upper limit value of AC current Isys. On the other hand, when the three-phase/two-phase transformation in coordinate transformation unit 110 is performed such that the current amplitude of AC current Isys may be K times (K: constant) current amplitude Imag on the d-q axes determined by equation (1), the upper limit value of limiter 125 is set to (1/K) times control upper limit value Imax.

Coordinate transformation unit 122 uses an output value from limiter 125 as an amplitude, and transforms current phase θi outputted from coordinate transformation unit 121, from a polar coordinate into a d-q coordinate, to generate a d-axis current command value Id* and a q-axis current command value Iq*.

Therefore, the phase of current command values Id* and Iq*, that is, the ratio between Id* and Iq* (Iq*/Id*, is the same as the ratio (Iq/Id) between d-axis current Id and q-axis current Iq generated from a detection value of AC current Isys. On the other hand, the amplitude of current command values Id* and Iq*, that is, $\sqrt{(Id^{*2}+Iq^{*2})}$, is limited by limiter 125 to less than or equal to control upper limit value Imax.

As a result, when current amplitude Imag is less than or equal to control upper limit value Imax, current command values Id* and Iq* generated by current command value generation unit 120 are equal to d-axis current Id and q-axis current Iq, respectively.

On the other hand, when current amplitude Imag is more than control upper limit value Imax, current command values Id* and Iq* are set such that the amplitude ($\sqrt{(Id^{*2}+Iq^{*2})}$) is equal to control upper limit value Imax and the ratio between Id* and Iq* is the same as the ratio between Id and Iq.

Deviation computation unit 130 has subtractors 131 and 132. Subtractor 131 subtracts d-axis current Id from d-axis current command value Id* to calculate a current deviation ΔId. Similarly, subtractor 132 subtracts q-axis current Iq from q-axis current command value Iq* to calculate a current deviation ΔIq.

Proportional control unit 140 has proportional elements 141 and 142. Proportional element 141 outputs a value obtained by multiplying current deviation ΔId outputted from subtractor 131 by a control gain Kcc (Kcc·ΔId). Similarly, proportional element 142 outputs a value obtained by multiplying current deviation ΔIq outputted from subtractor 132 by control gain Kcc (Kcc·ΔIq).

Decoupling control unit 150 has integral elements 151 and 152 with a time constant Tc, a subtractor 161, and an adder 162. Integral element 151 outputs an integrated value of the output value of proportional element 141 (Kcc·ΔId) to adder 162. Integral element 152 outputs an integrated value of the output value of proportional element 142 (Kcc·ΔIq) to subtractor 161.

Subtractor 161 outputs a value obtained by subtracting the output value of integral element 152 from the output value of proportional element 141 (Kcc·ΔId). Adder 162 outputs a value obtained by adding the output value of integral element 151 to the output value of proportional element 142 (Kcc·ΔIq).

Adjustment gain multiplication unit 170 has multipliers 171 and 172. Multiplier 171 outputs a value obtained by multiplying the output value of subtractor 161 by an adjustment gain Kcmp, as a correction term ΔVd of the d-axis voltage command value. Similarly, multiplier 172 outputs a value obtained by multiplying the output value of adder 162 by adjustment gain Kcmp, as a correction term ΔVq of the q-axis voltage command value.

As a result, correction terms ΔVd and ΔVq of the voltage command values for compensating for current deviations ΔId and ΔIq are indicated by the following equations (3) and (4). In this manner, deviation computation unit 130, proportional control unit 140, decoupling control unit 150, and adjustment gain multiplication unit 170 can constitute one embodiment of a "control computation unit".

$$\Delta Vd = Kcmp \cdot Kcc(\Delta Id - \Delta Iq/(s \cdot Tc)) \tag{3}$$

$$\Delta Vq = Kcmp \cdot Kcc(\Delta Iq + \Delta Id/(s \cdot Tc)) \tag{4}$$

Voltage command value correction unit 180 has subtractors 181 and 182. Subtractor 181 subtracts correction term ΔVd outputted from multiplier 171, from reference voltage command value Vdbs from voltage control unit 12 (FIG. 1), to generate voltage command value Vd*. Similarly, subtractor 182 subtracts correction term ΔVq outputted from multiplier 172, from reference voltage command value Vqbs from voltage control unit 12 (FIG. 1), to generate voltage command value Vq*.

As illustrated in FIG. 1, voltage command values Vd* and Vq* are inputted into three-phase voltage command generation unit 14, and are transformed into three-phase voltage command values Vu*, Vv*, and Vw*, by inverse transformation of the three-phase/two-phase transformation in coordinate transformation unit 110. PWM control unit 16 generates on/off control signals Sgu, Sgv, and Sgw for the four switching elements of each of three-level inverters 21*u*, 21*v*, and 21*w* shown in FIG. 2, by the PWM control according to voltage command values Vu*, Vv*, and Vw *. That is, three-phase voltage command generation unit 14 and PWM control unit 16 can constitute one embodiment of a "switching control unit".

In this manner, in the present embodiment, voltage command values Vd* and Vq* are generated by reflecting correction terms ΔVd and ΔVq for compensating for current deviations ΔId and ΔIq with respect to current command values Id* and Iq*, in reference voltage command values Vdbs and Vqbs for operating power converter 20 as a virtual synchronous generator.

In current command value generation unit 120, when the current amplitude of AC current Isys is less than or equal to control upper limit value Imax, current command values Id* and Iq* are set as Id*=Id and Iq*=Iq, and thus current deviations ΔId and ΔIq are set as ΔId=ΔIq=0, and thus correction terms ΔVd and ΔVq are set as ΔVd=ΔVq=0. In this case, reference voltage command values Vdbs and Vqbs are directly set as voltage command value Vd* and Vq*. Thereby, power converter 20 operates as a virtual synchronous generator.

In contrast, when the current amplitude of AC current Isys is more than control upper limit value Imax, current command values Id* and Iq* are set as command values for controlling the amplitude of AC current Isys to be equal to control upper limit value Imax. As a result, current deviations ΔId and ΔIq are set according to an excess of the current amplitude by d-axis current Id and q-axis current Iq over control upper limit value Imax.

Therefore, it is to be understood that, in current suppression control unit 100, correction terms ΔVd and ΔVq are calculated to compensate for current deviations ΔId and ΔId, and so when the amplitude of AC current Isys is more than predefined control upper limit value Imax, they are set to suppress the current amplitude to a reference value.

In such a current suppression control by current suppression control unit 100, decoupling between the d-q axes, in which decoupling control unit 150 causes current deviation ΔId to act on correction term ΔVq and causes current deviation ΔIq to act on correction term ΔVd, is performed by integral control.

Figure 5:
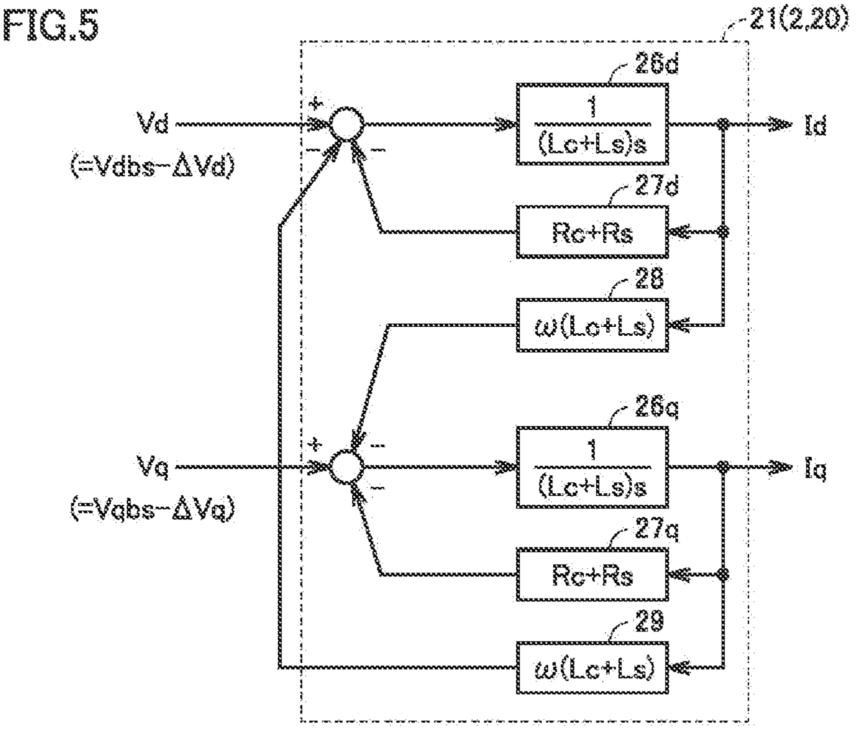
FIG. 5 is a block diagram illustrating transfer functions of a control target of the power conversion device in accordance with the present embodiment.

FIG. 5 shows a block diagram illustrating transfer functions of a control target of the power conversion device in accordance with the present embodiment.

In FIG. 5, transfer functions of a control target 21 having an output voltage of power converter 20 as an input and AC current Isys detected by current detector 7 as an output is shown on d-q coordinate axes. That is, the input to control target 21 is indicated by a d-axis voltage Vd and a q-axis voltage Vd obtained by performing three-phase/two-phase transformation on the output voltage of power converter 20. These d-axis voltage Vd and q-axis voltage Vd are controlled to voltage command value Vd* (Vd*=Vdbs−ΔVd) and voltage command value Vq* (Vq*=Vqbs−ΔVq) shown in FIG. 4.

The output of control target 21 is indicated by d-axis current Id and q-axis current Iq obtained by performing the three-phase/two-phase transformation on AC current Isys detected by current detector 7. These d-axis current Id and q-axis current Iq are equal to the output values of coordinate transformation unit 110 in FIG. 4.

Control target 21 is equal to synthesized impedances of power converter 20 and power system 2. Therefore, transfer functions 26*d*, 26*q*, 27*d*, 27*q*, 28, and 29 between d-axis voltage Vd, q-axis voltage Vq and d-axis current Id, q-axis current Iq are defined using a resistance component Rc and an inductance component Lc of power converter 20, a resistance component Rs and an inductance component Ls of power system 2, and an angular frequency ω of the output voltage (AC voltage) of power converter 20, on the d-q coordinate axes.

Transfer functions 26*d* and 27*d* indicate an interaction between voltage Vd and current Id on the d axis, and transfer functions 26*q* and 27*q* indicate an interaction between voltage Vq and current Iq on the q axis. The interaction by transfer functions 26*d* and 27*d* can be compensated for by feedback control that calculates voltage command value Vd* using current deviation ΔId. Similarly, the interaction by transfer functions 26*q* and 27*q* can be compensated for by feedback control that calculates voltage command value Vq* using current deviation ΔIq.

However, control target 21 further includes transfer function 28 by which d-axis current Id acts on q-axis current Vq, and transfer function 29 by which q-axis current Iq acts on d-axis current Vd. Therefore, decoupling is needed, in which d-axis current deviation ΔId is reflected in q-axis voltage command value Vd* and q-axis current deviation ΔId is reflected in q-axis voltage command value Vd* by decoupling control unit 150.

On the other hand, transfer functions 28 and 29 include inductance component Ls of power system 2. While inductance component Lc of power converter 20 can be estimated correctly according to a circuit constant, it is difficult to estimate inductance component Ls correctly, because it changes depending on the state of power system 2 such as a load state, whether or not a grounding accident occurs, the position where a grounding accident occurs, and the like.

Therefore, by calculating correction terms ΔVd and ΔVq with the decoupling by the integral control in decoupling control unit 150 as shown in FIG. 4, it becomes possible to set voltage command values Vd* and Vq* for compensating for current deviations ΔId and ΔIq and setting them to zero, even if inductance component Ls of power system 2 cannot be estimated correctly.

Conversely, if inductance component Ls of power system 2 can be estimated correctly, it is also possible to implement decoupling control by proportional control using a control gain set according to transfer functions 28 and 29, instead of the integral control. However, when the decoupling control is performed by the proportional control, there is a concern that an estimated error of inductance component Ls may destabilize the current suppression effect by current suppression control unit 100. In contrast, in the present embodiment, by performing the decoupling control by the integral control, the current suppression effect by current suppression control unit 100 can be stabilized without requiring estimation of inductance component Ls of power system 2.

In this manner, according to the power conversion device in accordance with the present embodiment, in control that operates the power converter interconnected to the power system as a voltage source, if the output current of the power converter increases due to a grounding accident or the like in the power system, it is possible to stably perform control that suppresses occurrence of an excess current.

<Variation of Current Suppression Control Unit>

Figure 6:
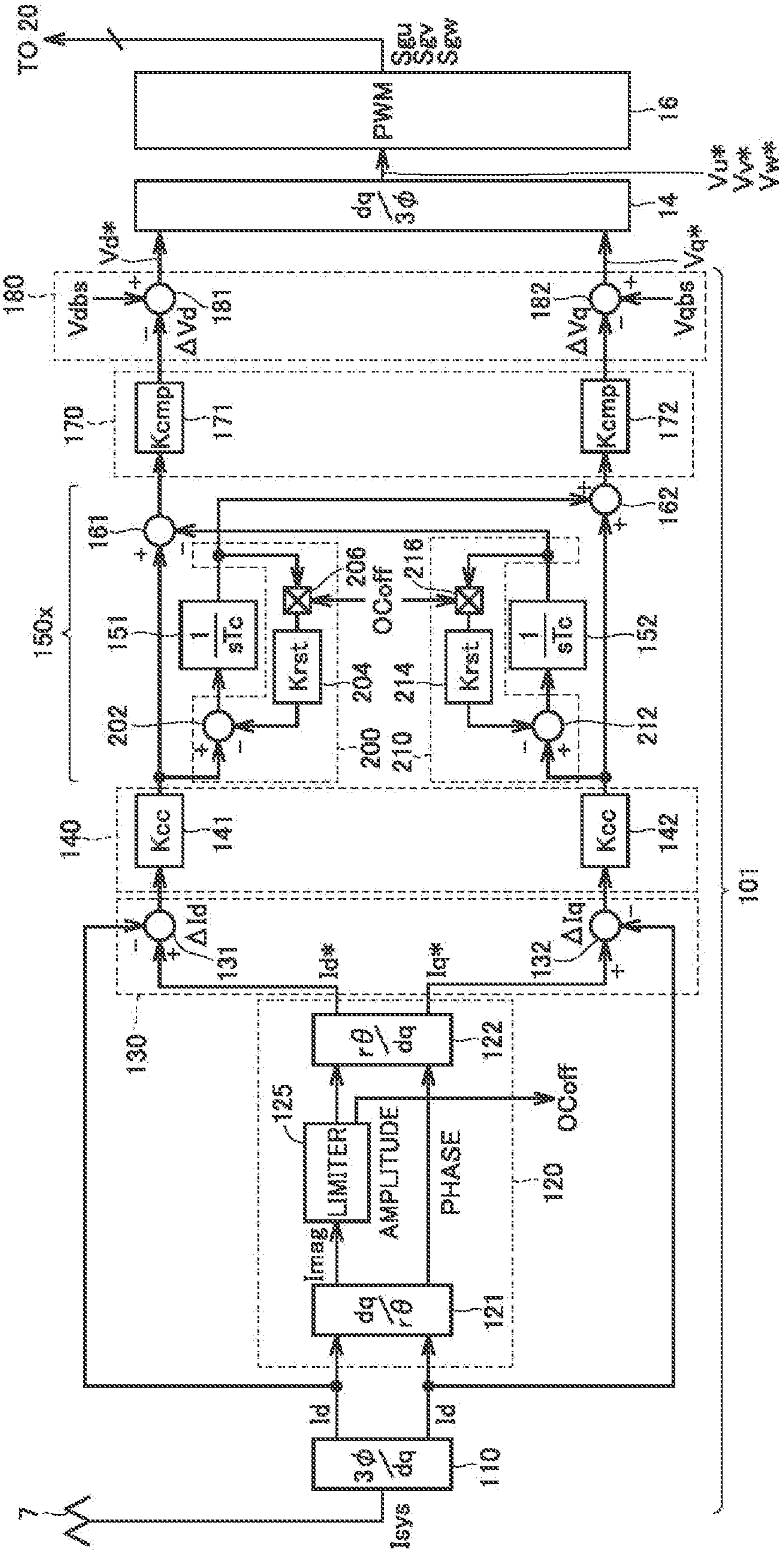
FIG. 6 is a block diagram illustrating a variation of the current suppression control unit.

FIG. 6 shows a block diagram illustrating a variation of the current suppression control unit.

A current suppression control unit 101 in accordance with the variation shown in FIG. 6 is different from current suppression control unit 100 in FIG. 4 in that it includes a decoupling control unit 150× instead of decoupling control unit 150. In addition to the configuration of decoupling control unit 150, decoupling control unit 150× further has integration reset units 200 and 201. In addition, limiter 125 further generates a control signal OCoff. Other than that, the configuration of current suppression control unit 101 is the same as that of current suppression control unit 100 in FIG. 4, and thus the detailed description will not be repeated.

When the amplitude of AC current Isys is less than or equal to control upper limit value Imax and the current suppression control is unnecessary, limiter 125 sets control signal OCoff to "1". On the other hand, when the amplitude of AC current Isys is more than control upper limit value Imax and the current suppression control is necessary, limiter 125 sets control signal OCoff to "0".

Integration reset unit 200 has a subtractor 202, a multiplier 204, and a gate 206. Gate 206 controls formation/cutoff of a feedback loop from an output node to an input node of integral element 151 according to control signal OCoff. In the case of control signal OCoff="1", the feedback loop of integral element 151 is formed, whereas in the case of control signal OCoff="0", the feedback loop is cut off.

When the feedback loop is formed, multiplier 204 outputs a value obtained by multiplying the output value of integral element 151 by a reset gain Krst. Basically, reset gain Krst is set as Krst=1.0. Subtractor 202 inputs a value obtained by subtracting the output value of multiplier 204 from the output value of proportional element 141 (Kcc·ΔId), into integral element 151.

Similarly, integration reset unit 210 has a subtractor 212, a multiplier 214, and a gate 216. In the case of control signal OCoff="1", gate 216 forms a feedback loop of integral element 152, as with gate 206. On the other hand, in the case of control signal OCoff="0", the feedback loop of integral element 152 is cut off.

When the feedback loop is formed, multiplier 214 outputs a value obtained by multiplying the output value of integral element 152 by the same reset gain Krst as that in multiplier 204. Subtractor 212 inputs a value obtained by subtracting the output value of multiplier 214 from the output value of proportional element 142 (Kcc·ΔIQ), into integral element 152.

In the case of control signal OCoff="1", the feedback loops of integral elements 151 and 152 are formed, and thereby the output values of integral elements 151 and 152 are subtracted from the input value of integral element 151.

As described above, control signal OCoff is set to "1" when the current suppression control for AC current Isys is unnecessary. Therefore, in the case of OCoff=1, current deviations ΔId=ΔIq=0 is obtained. As a result, it is to be understood that, in the case of OCoff=1, the output values of integral elements 151 and 152 are cleared to zero.

In contrast, control signal OCoff is set to "0" when the current suppression control for AC current Isys is necessary. In the case of OCoff=0, the feedback loops of integral elements 151 and 152 are not formed, and thereby the output values of proportional elements 141 and 142 are inputted into integral elements 151 and 152, respectively. On this occasion, operation of current suppression control unit 101 is the same as that of current suppression control unit 100. Thereby, the current suppression control can be stably performed as in current suppression control unit 100 illustrated in FIG. 4.

In current suppression control unit 101, the current suppression control with the decoupling by the integral control is performed in a limited manner correspondingly when the current amplitude increases. Providing integration reset units 200 and 201 can prevent an integral term used in the current suppression control from having an effect when the current suppression control is not performed. Thereby, control of power converter 20 can be stabilized.

Example of Application of Power Conversion Device

Figure 7:
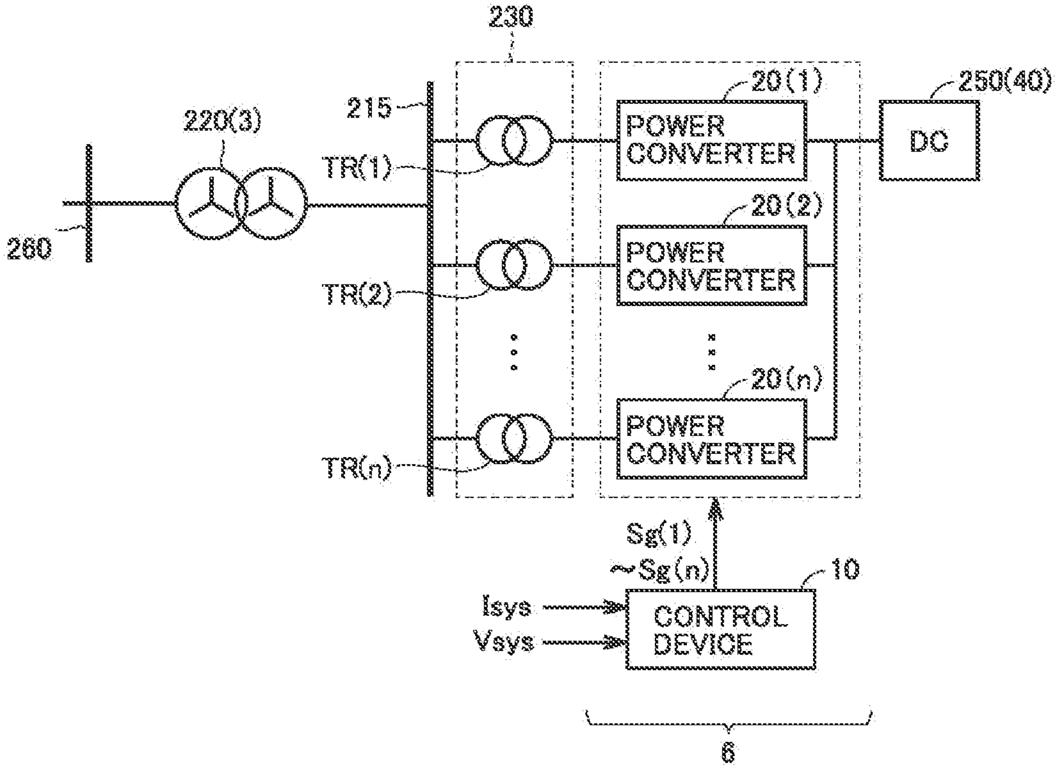
FIG. 7 is a block diagram illustrating another example of application of the power conversion device in accordance with the present embodiment.

FIG. 7 shows another example of application of the power conversion device in accordance with the present embodiment.

In the example of application in FIG. 7, power conversion device 6 in accordance with the present embodiment has a circuit configuration that achieves a larger capacity by operating a plurality of (n) power converters 20(1) to 20(*n*) in parallel.

Specifically, each of power converters 20(1) to 20(*n*) converts a DC voltage from a DC power source 250 corresponding to power storage element 40 in FIG. 1 into a three-phase AC voltage, by switching control according to on/off control signals Sg(1) to Sg(n) from control device 10, as in power converter 20 in FIG. 1. That is, each of on/off control signals Sg(1) to Sg(n) shown in FIG. 7 includes on/off control signals for three phases (for example, Sgu, Sgv, and Sgw in FIG. 2).

Sinusoidal AC voltages outputted from power converters 20(1) to 20(*n*) are synthesized in a multiple voltage transformer 230 having multiple windings TR(1) to TR(n) whose primary sides are connected with power converters 20(1) to 20(*n*), respectively, and are outputted to a power line 215. Power line 215 is connected to a high-voltage power line 260 included in power system 2 in FIG. 1, via a main voltage transformer 220 corresponding to voltage transformer 3 in FIG. 1.

Also in the exemplary configuration in FIG. 7, control device 10 generates d-axis voltage command value Vd* and q-axis voltage command value Vq* according to the configuration in FIG. 4 or FIG. 6. Then, when d-axis voltage command value Vd* and q-axis voltage command value Vq* are subjected to two-phase/three-phase transformation, AC voltage command values Vu*, Vv*, and Vw* are separately generated for each of power converters 20(1) to 20(*n*). Thereby, power conversion device 6 can have a larger capacity by operating power converters 20(1) to 20(*n*) in parallel, using common voltage command values Vd* and Vq* in which the current suppression control in the present embodiment is reflected.

It should be noted that, although the present embodiment has described an example where the voltage command values for operating power converter 20 as a voltage source are generated in voltage control unit 12 to operate power converter 20 as a virtual synchronous generator, the voltage command values are not limited to be generated by the virtual synchronous generator control. That is, the power conversion device in accordance with the present embodiment is implemented by causing current suppression control unit 100 or 101 described in FIG. 4 or FIG. 6 to act on a voltage command value (on the two-axis rotating coordinate system) generated by any control scheme for operating power converter 20 as a voltage source that outputs an AC voltage having an amplitude and a phase which are different from those in power system 2.

Further, although the present embodiment has described an example where the amplitude of AC current Isys outputted from power converter 20 is suppressed in current suppression control unit 100 or 101, it is also possible to configure current command value generation unit 120 to suppress another index (for example, an effective value) of AC current Isys to less than or equal to a predefined control upper limit value.

The configuration illustrated as the embodiment described above is an example of the configuration of the present disclosure, and can be combined with another known technique, or can be modified, such as partially omitted, without departing from the gist of the present disclosure.

It should be understood that the embodiment disclosed herein is illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST

2: power system: 3: voltage transformer; 6: power conversion device; 7: current detector; 8: voltage detector; 10: control device; 12: voltage control unit; 14: three-phase voltage command generation unit; 16: PWM control unit; 20: power converter; 21: control target; 21*u*, 21*v*, 21*w*: three-level inverter; 26*d*, 26*q*, 27*d*, 27*q*, 28, 29: transfer function; 100, 101: current suppression control unit; 110, 121, 122: coordinate transformation unit; 120: current command value generation unit; 125: limiter; 130: deviation computation unit; 140: proportional control unit; 141, 142: proportional element; 150, 150*x*: decoupling control unit; 151, 152: integral element; 162: adder; 170: adjustment gain multiplication unit; 171, 172, 204, 214: multiplier; 180: voltage command value correction unit; 200, 201, 210: integration reset unit; 206, 216: gate; 215: power line; 220: main voltage transformer; 230: multiple voltage transformer; 250: element, 260: high-voltage power line; Isys: AC current; Id: current (d axis); Id*: current command value (d axis); Iq: current (q axis); Iq*: current command value (q axis); Imax: control upper limit value; Kcc: control gain; Kcmp: adjustment gain; Krst: reset gain; OCoff: control signal (integration reset); Sg(1) to Sg(*n*), Sgu, Sgv, Sgw: on/off control signal; Vsys: AC voltage; Vdbs, Vqbs: reference voltage command value; Vd*: voltage command value (d axis); Vq*: voltage command value (q axis); Vu*, Vv*, Vw*: AC voltage command value.

The invention claimed is:

1. A power conversion device comprising:

at least one power converter configured to include switching elements, for converting DC power from a DC power source into AC power and outputting the AC power to a power system; and a control device to control power conversion in the power converter, the control device including a voltage control unit to generate a reference voltage command value for operating the power converter as a voltage source that outputs an AC voltage having a frequency and a phase which are different from those in the power system, a current suppression control unit to calculate a correction term for a current suppression control to suppress an output current from the power converter to less than or equal to a predefined control upper limit value base on a detected value of the output current, and to generate a voltage command value of the power converter by reflecting the correction term in the reference voltage command value, and a switching control unit to control turning on/off of the switching elements of the power converter according to the voltage command value in which the correction term is reflected, the current suppression control unit having a current command value generation unit to generate current command values of a first axis and a second axis on a two-axis rotating coordinate system, a control computation unit to calculate respective current deviations of the first axis and the second axis of the output current obtained by transforming the detected value to the rotation coordinate system, with respect to the current command values of the first axis and the second axis, and to calculate, on the rotating coordinate system, the correction term of the first axis and the second axis for compensating for the calculated respective current deviations of the output current of the first axis and the second axis, and a voltage command value correction unit to calculate the voltage command value using the correction term and the reference voltage command value, the current command value generation unit setting the current command values of the first axis and the second axis at output currents of the first axis and the second axis corresponding to the control upper limit value, when the output current is more than the control upper limit value, and setting the current command values of the first axis and the second axis substantially equal to the output current of the first axis and the second axis, when the output current is less than the control upper limit value, and the control computation unit having a first proportional element configured to output a value obtained by multiplying the current deviation of the first axis by a proportional gain, a second proportional element configured to output a value obtained by multiplying the current deviation of the second axis by a proportional gain, and a decoupling control unit to calculate the correction term, the decoupling control unit having a first integral element configured to output a value obtained by multiplying an integral value of the current deviation of the first axis by an integral gain, and a second integral element configured to output a value obtained by multiplying an integral value of the current deviation of the second axis by an integral gain, wherein the decoupling control unit is configured to calculate the correction term of the first axis using the output values of the first proportional element and the second integral element, and to calculate the correction term of the second axis using the output values of the second proportional element and the first integral element, and the voltage command value correction unit is configured to calculate the voltage command value of the first axis using the reference voltage command value of the first axis transformed on the rotating coordinate system and the correction term of the first axis by the decoupling control unit, and to calculate the voltage command value of the second axis using the reference voltage command value of the second axis transformed on the rotating coordinate system and the correction term of the second axis by the decoupling control unit.

2. The power conversion device according to claim 1, wherein, when the output current is less than the control upper limit value, each of calculated values of the current deviations of the first axis and the second axis is set to zero in the control computation unit.

3. The power conversion device according to claim 1, wherein the decoupling control unit further has an integration reset unit to clear an output value of each of the first and second integral elements to zero when the output current is equal to the control upper limit value.

4. The power conversion device according to claim 1, wherein a plurality of the power converters are arranged, the plurality of power converters are connected to the power system in parallel via a multiple voltage transformer, and the control device operates the plurality of power converters in parallel, according to the voltage command value that is common in which the correction term is reflected.

5. A control device for a power converter configured to include switching elements, for converting DC power from a DC power source into AC power and outputting the AC power to a power system, the control device comprising:

a voltage control unit to generate a reference voltage command value for operating the power converter as a voltage source that outputs an AC voltage having a frequency and a phase which are different from those in the power system, a current suppression control unit to calculate a correction term for a current suppression control to suppress an output current from the power converter to less than or equal to a predefined control upper limit value base on a detected value of the output current, and to generate a voltage command value of the power converter by reflecting the correction term in the reference voltage command value, and a switching control unit to control turning on/off of the switching elements of the power converter according to the voltage command value in which the correction term is reflected, the current suppression control unit including a control computation unit to calculate respective current command values of a first axis and a second axis on a two-axis rotating coordinate system, a control computation unit to calculate respective current deviations of the first axis and the second axis of the output current obtained by transforming the detected value to the rotating coordinate system, with respect to the current command values of the first axis and the second axis, and to calculate, on the rotating coordinate system, the correction term of the first axis and the second axis for compensating for the calculated respective current deviations of the output current of the first axis and the second axis, and a voltage command value correction unit to calculate the voltage command value using the correction term and the reference voltage command value, the current command value generation unit setting the current command values of the first axis and the second axis at output currents of the first axis and the second axis corresponding to the control upper limit value, when the output current is more than the control upper limit value, and setting the current command values of the first axis and the second axis substantially equal to the output current of the first axis and the second axis, when the control current is less than the control upper limit value, and the control computation unit having a first proportional element configured to output a value obtained by multiplying the current deviation of the first axis by a proportional gain a second proportional element configured to output a value obtained by multiplying the current deviation of the second axis by a proportional gain, and a decoupling control unit to calculate the correction term, the decoupling control unit having a first integral element configured to output a value obtained by multiplying an integral value of the current deviation of the first axis by an integral gain, and a second integral element configured to output a value obtained by multiplying an integral value of the current deviation of the second axis by an integral gain, wherein the decoupling control unit is configured to calculate the correction term of the first axis using the output values of the first proportional element and the second integral element, and to calculate the correction term of the second axis using the output values of the second proportional element and the first integral element, and the voltage command value correction unit is configured to calculate the voltage command value of the first axis using the reference voltage command value of the first axis transformed on the rotating coordinate system and the correction term of the first axis by the decoupling control unit, and to calculate the voltage command value of the second axis using the reference voltage command value of the second axis transformed on the rotating coordinate system and the correction term of the second axis by the decoupling control unit.

6. The control device according to claim 5, wherein, when the output current is less than the control upper limit value, each of calculated values of the current deviations of the first axis and the second axis is set to zero in the control computation unit.

7. The control device according to claim 5, wherein the decoupling control unit further has an integration reset unit to clear an output value of each of the first and second integral elements to zero when the output current is less than or equal to the control upper limit value.

* * * * *